United States Patent
Floyd et al.

(10) Patent No.: US 10,924,364 B2
(45) Date of Patent: *Feb. 16, 2021

(54) ELASTIC SYSTEM MONITORING

(71) Applicant: New Relic, Inc., San Francisco, CA (US)

(72) Inventors: Nicholas A. Floyd, Savannah, TX (US); Gregory A. Kim, Portland, OR (US)

(73) Assignee: New Relic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,181

(22) Filed: Nov. 22, 2019

(65) Prior Publication Data
US 2020/0091413 A1    Mar. 19, 2020

Related U.S. Application Data

(63) Continuation of application No. 15/684,847, filed on Aug. 23, 2017, now Pat. No. 10,529,912.

(51) Int. Cl.
*G06F 15/173*    (2006.01)
*H04L 12/26*     (2006.01)
(Continued)

(52) U.S. Cl.
CPC ........ *H04L 43/024* (2013.01); *G06F 11/0706* (2013.01); *G06F 11/0748* (2013.01);
(Continued)

(58) Field of Classification Search
CPC ........... G06F 11/30; G06F 11/34; H04L 67/22
See application file for complete search history.

(56) References Cited

U.S. PATENT DOCUMENTS

| | | | | |
|---|---|---|---|---|
| 2002/0183972 A1* | 12/2002 | Enck | ................... | G06F 11/3409 |
| | | | | 702/186 |
| 2010/0251218 A1* | 9/2010 | Mahesh | .............. | G06F 11/0748 |
| | | | | 717/127 |

(Continued)

OTHER PUBLICATIONS

United States Office Action, U.S. Appl. No. 15/684,847, dated May 1, 2019, 11 pages.

*Primary Examiner* — Padma Mundur
(74) *Attorney, Agent, or Firm* — Fenwick & West LLP

(57) ABSTRACT

A monitoring system using agents to dynamically collect state information at controllable intensity levels from components of systems. The system receives state information collected by an agent at a particular intensity level, and processes the state information to determine an updated intensity level for collecting state information by the agent, or by some other agent. The state information may include data indicating the performance of one or more components, such as process response times or other metrics. The intensity level for collecting further state information can be increased when, among other things, previously collected state information indicates more detailed monitoring for the component is appropriate. The intensity level for collecting further state information can be decreased when, among other things, previously collected state information indicates continued expected behavior.

20 Claims, 7 Drawing Sheets

(51) Int. Cl.
  *G06F 11/30*    (2006.01)
  *G06F 11/07*    (2006.01)
  *H04L 29/08*    (2006.01)
  *G06F 11/34*    (2006.01)
  *H04L 12/24*    (2006.01)

(52) U.S. Cl.
  CPC .......... *G06F 11/0766* (2013.01); *G06F 11/30* (2013.01); *G06F 11/301* (2013.01); *G06F 11/34* (2013.01); *H04L 41/142* (2013.01); *H04L 43/00* (2013.01); *H04L 67/12* (2013.01); *H04L 67/22* (2013.01); *H04L 41/0681* (2013.01); *H04L 43/16* (2013.01)

(56) References Cited

U.S. PATENT DOCUMENTS

2016/0204992 A1  7/2016  Wu et al.
2017/0090955 A1  3/2017  Hsiao

\* cited by examiner

500

```
Receive, from an agent of a component of a system, first state
information regarding the component, the first state information
collected by the agent at a first intensity level
502
```

↓

```
Determine a second intensity level for collecting second state
information regarding the component by the agent based on
the first state information, the second intensity level being
different from the first intensity level
504
```

↓

```
Send an instruction to the agent that causes the agent to
collect the second state information at the second intensity
level
506
```

↓

```
Receive the second state information collected by the agent at
the second intensity level from the agent
508
```

Receive, from a plurality of agents of a plurality of components of a system, first state information regarding the components, the first state information collected by the agents at a first intensity level
602

---

Determine a second intensity level for collecting second state information regarding the components by the agents based on the first state information, the second intensity level being different from the first intensity level
604

---

Send instructions to the plurality of agents of the plurality of components, the instructions causing each of the plurality of agents to selectively collect state information at the first intensity level or the second intensity level
606

---

Receive the state information from the plurality of agents at the first intensity level or the second intensity level
608

FIG. 6

ELASTIC SYSTEM MONITORING

CROSS REFERENCE TO RELATED APPLICATIONS

This application is a continuation of U.S. application Ser. No. 15/684,847, filed on Aug. 23, 2017, which is incorporated herein by reference in its entirety for all purposes.

BACKGROUND

The present disclosure relates to monitoring of components of systems.

Optimizing data collection and parsing collected data into a useful form is a challenge in the field of software analytics and monitoring. Collecting metrics on large online systems can create large volumes of data that is difficult to manage and use. Excessive data collection causes performance issues in user applications and systems, slowing down the systems they monitor and contributing to poor performance. Storing the large quantities of data also greatly increases the storage costs of the online system. Not gathering unnecessary data can lower costs.

SUMMARY

A monitoring system uses an agent to monitor a component of a system. The monitoring system receives, from an agent of the component of the system, first state information regarding the component, the first state information collected by the agent at a first intensity level. The monitoring system determines a second intensity level for collecting second state information regarding the component by the agent based on the first state information. The second intensity level may be different from the first intensity level. The monitoring system sends an instruction to the agent that causes the agent to collect the second state information at the second intensity level. As a result, the monitoring system receives the second state information collected by the agent at the second intensity level from the agent.

Some embodiments include a system for monitoring a component. The system includes one or more processors. The one or more processors are configured to receive, from an agent of the component, first state information regarding the component, the first state information collected by the agent at a first intensity level. The processors determine a second intensity level for collecting second state information regarding the component by the agent based on the first state information. The second intensity level may be different from the first intensity level. The processors send an instruction to the agent that causes the agent to collect the second state information at the second intensity level. As a result, the processors receive the second state information collected by the agent at the second intensity level from the agent.

Some embodiments include a non-transitory computer readable medium storing instructions that when executed by a processor configure the processor to receive, from an agent of a component of a system, first state information regarding the component, the first state information collected by the agent at a first intensity level. The instructions configure the processor to determine a second intensity level for collecting second state information regarding the component by the agent based on the first state information. The second intensity level may be different from the first intensity level. The instructions configure the processor to send an instruction to the agent that causes the agent to collect the second state information at the second intensity level. As a result, the instructions configure the processor to receive the second state information collected by the agent at the second intensity level from the agent.

BRIEF DESCRIPTION OF DRAWINGS

FIG. 5 is a flowchart illustrating a process for changing the data collection intensity by an agent of a component of a system, according to one embodiment.

FIG. 6 is a flowchart illustrating a process for changing the data collection intensity by a plurality of agents of components of a system, according to one embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Embodiments relate to a monitoring system using monitors to dynamically collect state information, at intensity levels, from components of systems. State information includes data indicating the performance of one or more components, such as process response times or other metrics. An intensity level defines a measure of collection rate for the state information. The intensity level may describe the collection rate of one component or it may describe the collection rate of a plurality of components. Embodiments specifically relate to a monitoring system with the ability to monitor a range of diverse systems. For example, the monitoring system may accommodate a system with a few large components or many small components.

Figure 1:
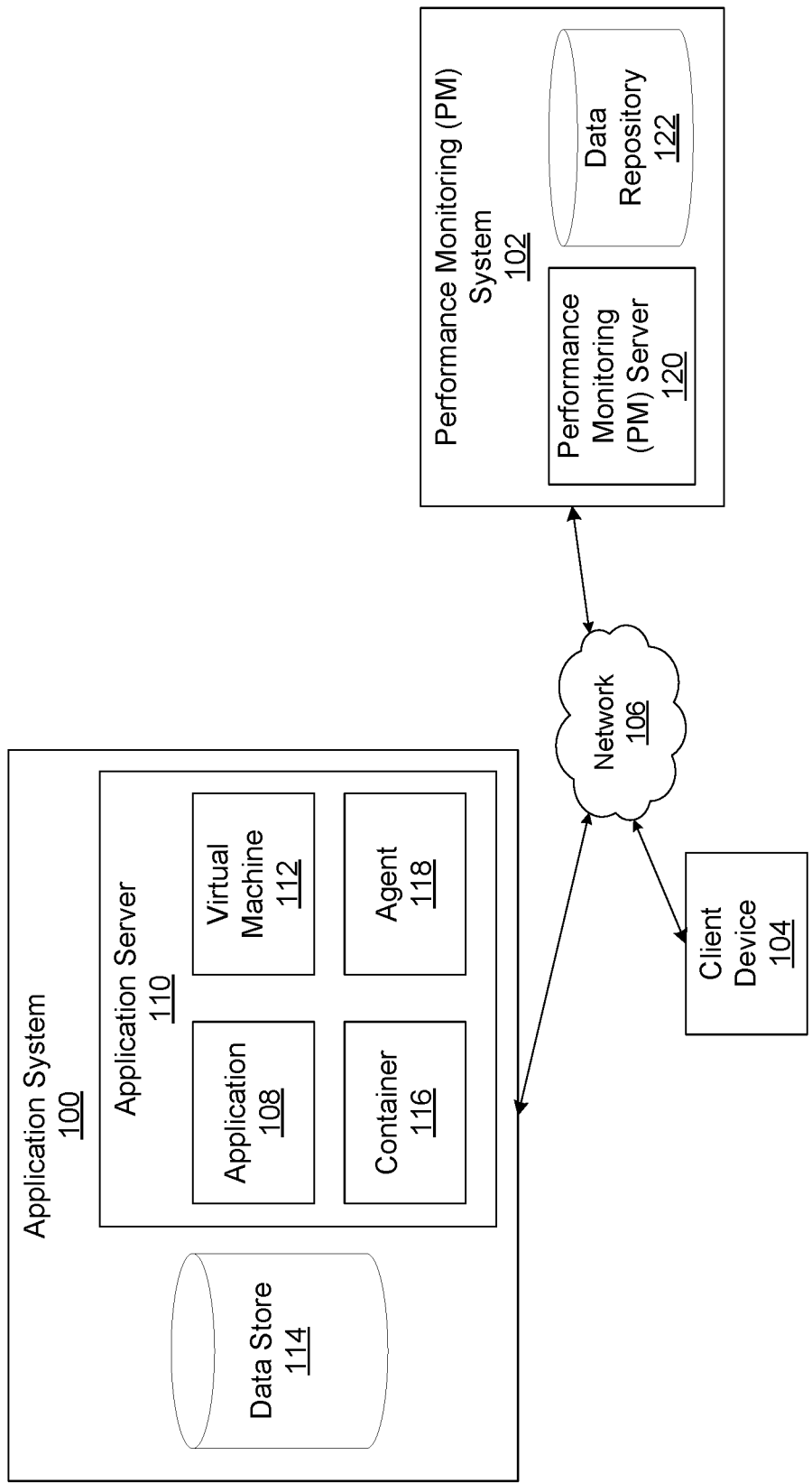
FIG. 1 is schematic block diagram illustrating a system environment for a performance monitoring (PM) system, according to one embodiment.

FIG. 1 is schematic block diagram illustrating a system environment for a performance monitoring (PM) system 102, according to one embodiment. The system environment includes an application system 100 that is monitored by PM system 102 and communicates information with a client device 104 via a network 106. The application system 100 may include a data store 114, an application server 110, an application 108, a virtual machine 112, a container 116, and an agent 118. The PM system 102 may include a performance monitoring (PM) server 120 and a data repository 122. In alternative configurations, different and/or additional modules may be included in the system environment.

The client device 104 is a device with computing functionality and data communication capabilities capable of receiving user input as well as transmitting and/or receiving data via the network 106. The client device 104 communicates with the application system 100 and the PM system 102 via the network 106. In various embodiments, the client device 104 may be a wired user device, such as a desktop computer, or a mobile user device, such as a laptop computer, a personal digital assistant (PDA), a mobile telephone, a smartphone, tablet, or wearable device. The client device 104 may be used by an operator of the application system 100 and/or PM system 102. For example, the client device may be used by an operator of the application system 100 to receive updates, from the PM system 102, concerning the performance of components of the application system 100. Although a single client device 104 is shown in FIG. 1, the environment may include any number of client devices 104.

The network 106 provides a pathway for communication between the application system 100, the PM system 102, and the client device 104. The network 106 can include various types of communication networks, including wired and/or wireless networks. In some embodiments, the network 106 includes the Internet.

The application system 100 may provide an application 108 to the client device 104 via the network 106. The application system 100 includes components that may be monitored by the PM system 102, such as the data store 114, the application server 110, the application 108, the virtual machine 112, the container 116, and/or the agent 118.

The application server 110 communicates data, information, instructions, or services between the client device 104 and the application 108 or data store 114 via the network 106. For example, the application server 110 receives an information request from the client device 104, processes the received information request, and transmits the requested information back to the client device 104 via the network 106. Although a single server 110 is shown in FIG. 1, the application system 100 may include any number of servers 110.

The application 108 may be a mobile application or a web application operated by the application server 110. The application 108 may be server-side code that executes on a server (e.g., the application server 110), although an application may also use client-side code as appropriate. The application 108 may represent a subset of operations of a client-server application. For example, the application 108 operated by the application system 100 includes server-side processes of a client-server application, such as retrieving and storing database content in the data store 114, generating user interfaces for rendering at the client device 104, performing functions requested at the client device 104, and communicating content to the client device 104 via the network 106. Although a single application 108 is shown in FIG. 1, the application system 100 may comprise one or more computing devices executing the functions of the application 108.

In some embodiments, the application server 110 includes a computing device executing a virtual machine 112 that emulates a computer used for running processes of the application 108. The application system 100 may include any number of virtual machines 112 that emulate a computer system. The virtual machine 112 provides an environment for running the application 108 or processes of the application 108, and manages objects created by the application 108. The virtual machine 112 allocates memory by moving objects, including variables or data structures created during execution of the application 108 and agent 118, between pools of memory to efficiently manage the available memory of the application system 100. The virtual machine also executes garbage collection processes to identify and remove objects no longer used or referenced in the application 108 to free up the memory occupied by the unused objects for storing other objects. In some embodiments, the application system 100 includes multiple virtual machines 112 executing across multiple application servers 110, each virtual machine 112 executing one or more applications 108.

The container 116 is a software container that interacts with the application 108, such as when the application 108 includes a servlet. Although a single container 116 is shown in FIG. 1, the application system 100 may include any number of containers 116. In some embodiments, the application system 100 includes multiple containers 116 executing across multiple applications, each container 116 executing one or more applications 108.

The agent 118 collects and stores state information regarding the components of the application system 100, and periodically reports the state information to the PM server 120. The agent 118 may be provided to the application server 110 (e.g., as a software development kit or as a module integrated into the software of the application server 110) by the PM server 120. While the application server 110 executes the agent 118, the PM server 120 communicates with the agent 118 to monitor the performance of the data store 114, the application server 110, and the components executing on the application server 110, including the application 108, the virtual machine 112, and/or the container 116. For example, the agent 118 may provide state information that includes processes running on the application server 110, response time of the application 108, transactions in the application 108, the effect of backend processes on performance of the application 108 at client devices 104, statistics of the virtual machine 112 running the application 108, or other information. In some embodiments, each component of the application system 100 has a corresponding agent 118 that monitors and collects state information for the PM server 120.

In some embodiments, the agent 118 collects state information regarding a component at adjustable intensity levels. The state information includes data indicating the performance of the component, such as process response times or other metrics. The intensity level defines a measure of collection rate for the state information. A change in the intensity level can result in a change in the level of data detail and/or data volume that is captured in the state information. The intensity level or a change in intensity level may be determined by the PM system 102 (described below).

In some embodiments, the agents 118 are customized or configured for the application system 100 and/or the components being monitored by the agents 118. In some embodiments, the agents 118 are customized to be a part of a collective or group of agents 118. For example, state information is collected by the agents 118 based on the context of a given application system 100 or environment. The state information may be collected by agents 118 according to the context of environment (such as technology stacks or Internet cloud provider), business impacts (such as sales or promoted events), temporal events (such as holidays or other yearly, known events), system events (such as software releases or patching operating systems), and others. In some embodiments, the grouping of state information based upon context may be done by the PM system 102.

The data store 114 stores application data for the application 108, the virtual machine 112, the container 116, and the agent 118 executed by the one or more application servers 110. Although a single data store 114 is shown in FIG. 1, the application system 100 may include any number of data stores 114.

The PM system 102 is a monitoring system that collects state information, at an intensity level, from components of an application system 100 (sent by one or more agents 118) and may use the state information to tune the behavior of the agents 118. The PM system 102 can instruct the agents 118 to dynamically shrink or grow the state information collected (by changing intensity level) depending on the state of the application system 100 and information provided to the PM system 102 by a CPM system 200 (described with reference to FIG. 2). The PM system 102 may be a module of an application monitoring service provider. The PM system 102 may monitor the performance of one or more application systems 100. Alternatively, a plurality of PM systems 102 may monitor a single application system 100. The PM system 102 may also distinguish components into component groups (described with reference to FIG. 2). Although a single PM server 120 and data repository 122 are shown in FIG. 1, the PM system 102 may include any number of PM servers 120 and/or data repositories 122.

In some embodiments, the PM system 102 may uniformly monitor all components of the application system 100. For example, all components may send state information at the same intensity level to the monitoring system. This collection uniformity may create overwhelming amounts of state information and allow actionable insights to become harder to find and/or slow down the components being monitored. Additionally, as a result of uniform monitoring the PM system 102 may collect state information that is not critical or important.

In some embodiments, the PM system 102 monitors different state information from each component, and may monitor components at different intensity levels. These embodiments allow the PM system 102 to collectively adapt to different application systems 100 and situations as needed (i.e., the PM system 102 can adapt to monitor what is needed, when it is needed). The PM system 102 is able to expand or contract the data it gathers based on a set of parameters that are either predefined or dynamically generated from other PM systems 102 or a CPM system 200 (described with reference to FIG. 2). For example, if an application system 100 contains several similar components, the PM system 102 may only collect state information from one of the similar components. In another example, the PM system 102 may adjust the intensity level of a component after a software update is performed on the component of the application system 100.

The PM server 120 monitors the performance of the application system 100. In particular, the PM server 120 is a computing device including one or more processors that monitor the performance of components of the application system 100 via communication with the agent 118. The PM server 120 instructs each agent 118 to collect state information at an intensity level. The PM server 120 may analyze the content of the state information and/or compare the received state information with one or more threshold values. In response, the PM server 120 may generate a notification and/or instructions to be sent to the client device 104 and/or the agent 118 (described with reference to FIG. 3). For example, in response to a decrease in the performance of a component of the application system 100, the PM server 120 may increase the intensity level of state information collected from the component and send a notification to the client device 104.

In some embodiments, the PM server 120 makes predictions about the future behavior of the application system 100 based upon the past and current behavior of the application system 100. This allows the PM server 120 to configure the agents 118 based on the expected future behavior. For example, the PM server 120 could increase or decrease the intensity level of an agent 118 depending on the time of day. The PM server 120 can also provide recommendations to application system 100 operators about potential failure points if actions are not taken. For example, the PM server 120 could identify trends that will lead to a point of failure if an operator does not increase the capacity of a component. In response, the PM server 120 may notify the application system 100 operators to take action.

The PM server 120 receives state information from the agent 118 collected at an initial intensity level, and may determine an updated intensity level for collecting further state information by the agent 118, or other agents 118. In some embodiments, the PM server 120 may determine an updated intensity level based on received instructions from a client device 104. In some embodiments, the PM server 120 may determine an updated intensity level based on the received state information, or changes between the received state information and previous instances of state information. In some embodiments, the PM server 120 may determine an updated intensity level based upon guidance from a CPM system 200 (described with reference to FIG. 2). In some embodiments, the PM server 120 may determine an updated intensity level for a single component or a plurality of components to be collected by one or more agents 118.

In some embodiments, the intensity level may be determined based on a data intensity factor (DIF) that is calculated from the state information. The DIF gives an indication of performance and/or activity of the monitored component or components. DIF is defined by Equation 1:

$$DIF = \frac{E + T + N + P + SR + SH}{Env}, \qquad (1)$$

where E defines user event values, T defines throughput values, N defines network state values, P defines process state values, SR defines system resource values, SH defines system health values, and Env defines a weighting factor value for the component or components being monitored (e.g., application 108, virtual machine 112, container 116, etc.).

The DIF may be determined based on one or more of the E, T, N, P, SR, and SH parameters. Various parameters may be more useful in different types of monitored components, and DIF values for such components can be adjusted accordingly. In some embodiments, the DIF is determined or adjusted using machine learning methods. The weighting factor Env can be different for different types of components. In some embodiments, different parameters of a component can be weighted by a different weighting factor Env. The E, T, N, P, SR, and SH parameters of a monitored component indicate the occurrence of various states and events, as extracted from the state information received from the agent 118. The PM server 120 determines, based on the state information, the E, T, N, P, SR, and SH values indicating the significance of these states and events to the performance of the monitored component.

The user event value E defines a number of user events external to the application system 100, such as temporal events or established events for a given market. For example, the agent 118 captures data related to such user events being processed by a component executing on the application server 110, and the PM server 120 detects the occurrence of an event and calculates the event value E from the state information received from the agent 118. The throughput value T may be a number of requests flowing in and out of the component. For example, an agent 118 detects a number of content requests between the client device 104 and application 108 being executed on the application server 110, and transmits state information related to the throughput of these requests to the PM server 120. The PM server 120 determines the throughput value T from the state information received from the agent 118 relating to the content requests between the client device 104 and application 108. The network state value S may be a number representing latency, byte transfer rate (e.g., bytes over the wire), or packets lost or received. The process state value P may be a number representing resource consumption or user heuristics, such as the number of requests processed, the rate of requests received, and/or thread count. For example, the PM server 120 uses the resources consumed by the virtual machine 112 to calculate the process state value P based upon the state information from the agent 118. The system resource value SR may be the available CPU, memory, and/or disk storage. The system health value SH may be determined by a set of defined heuristics, such as Application Performance Index (APDEX). For example, based upon the defined heuristics the PM server 120 may determine the system health value SH from the state information from the agent 118.

In some embodiments, the PM server 120 determines the updated intensity level for collecting state information by the agent 118, based on the DIF. In some embodiments, the PM server 120 associates (e.g., based on a lookup table or an algorithmic relationship) different values of DIF with different rates of data collection and generates the updated intensity level based on this association. In some embodiments, different intensity levels define different types of state information collection schemes. For example, a higher intensity level can be associated with instrumentation and collection of state information for additional processes, packages, or other parts of the monitored component. In another example, a higher intensity level can be associated with deeper discovery process invocation chains and collection of their state information. In some embodiments, the intensity level affects the type of state information collected, and thus the types of E, T, N, P, SR, and SH values used in further updating the DIF.

Once the updated intensity level for collecting state information by the agent 118 is determined, the PM server 120 sends an instruction to the agent 118 that causes the agent 118 to collect state information at the updated intensity level. This updated intensity level can be a different intensity level than the initial intensity level employed by the agent 118 to collect the state information. In response to updating the intensity level, the PM server 120 may send instructions or notifications regarding the state information or intensity levels to the client device 104.

For example, a database program (e.g., MongoDB) hosted by an application system 100 incorrectly consumes too many Transmission Control Protocol (TCP) ports and, as a result, the application system 100 slows down. Without an agent 118 monitoring the application system 100, the application system 100 may suffer from port exhaustion and crash before an operator of the application system 100 can recognize or identify the problem. However, because of the collection of state information, the PM server 120 may detect a change in the T, P, N, and SH parameters. As a result, the PM server 120 calculates an updated intensity level and instructs the agent 118 to collect state information at the updated intensity level. The updated intensity level increases the state information related to the database program consuming TCP ports and may result in the PM server 120 identifying the problem or assisting the operator to identify the problem before the application system 100 crashes.

In some embodiments, the PM server 120 receives state information at an initial intensity level from multiple agents 118 monitoring multiple components. Based upon the state information received at the initial intensity levels and guidance from a CPM system 200 (described with reference to FIG. 2), the PM server 120 determines updated intensity levels (e.g., based upon the DIF). After determining updated intensity levels, the PM server 120 sends instructions to the plurality of agents 118 that causes each of the agents 118 to collect state information from the plurality of components at the updated intensity levels or to continue collecting state information at the initial intensity level. This results in the PM server 120 receiving state information at the initial intensity level or the updated intensity levels from the plurality of agents 118. In some embodiments, the PM server 120 monitors components at rotating intensity levels i.e., allowing one or more agents 118 to collect state information from some components at higher rates than from other components. For example, one or more agents 118 can collect state information from different components at the higher intensity level at different times. Among other things, rotation allows each component to have a turn at a higher intensity level while also allowing each component to have a period of time at a lower intensity level.

In some embodiments, the PM server 120 associates components into a component group (described with reference to FIG. 2). In a component group, the PM server 120 may use state information collected at an intensity level from a component in the component group to determine an updated intensity level for collecting state information for another component in the component group. As such, the collected state information from one component in a component group is used to determine an updated intensity level for another component in the component group. For example, for a component group including two application servers 110 in an application system 100, the PM server 120 may use the collected state information from one server 110 to calculate an updated intensity level for the second server 110.

The data repository 122, stores data used by the PM system 102, including state information collected from agents 118 and configuration information for calculating updated intensity levels. The PM server 120 accesses the data repository 122 to manage the data collection from each of the agents 118. In some embodiments, the data repository 122 allows comparison of current performance behavior to past performance behavior and allows a deeper understanding of the lifecycle trends of the application system 100.

Figure 2:
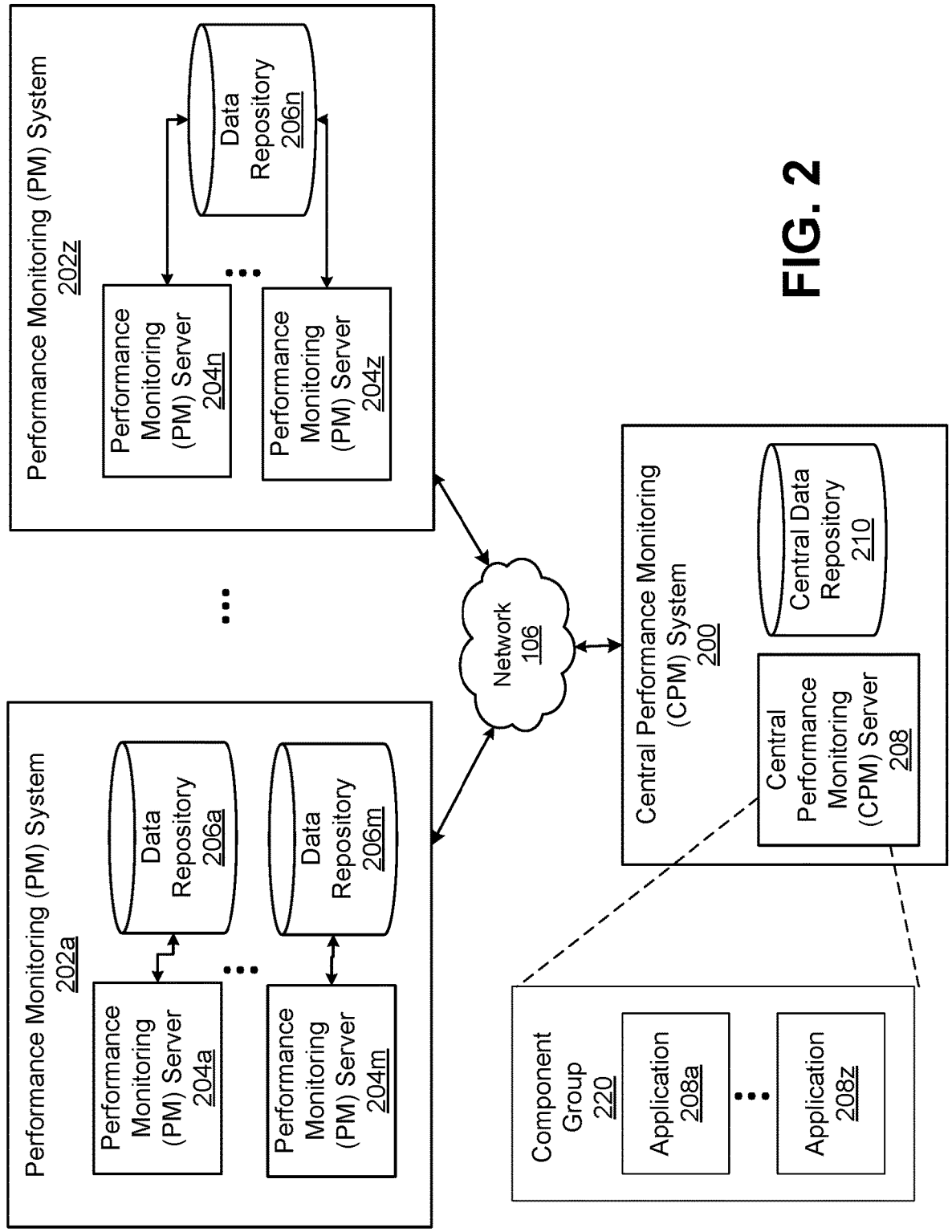
FIG. 2 is a schematic block diagram illustrating a system environment for a central performance monitoring (CPM) system, according to one embodiment.

FIG. 2 is a schematic block diagram illustrating a system environment for a CPM system 200, according to one embodiment. The CPM system 200 communicates with multiple PM systems 202a-202z, aggregating and analyzing their state information, and determining intensity levels of agents 118 for the PM systems 202a-202z, based on aggregated state information. The environment contains the CPM system 200, and a plurality of PM systems, such as shown by PM systems 202a-202z, that communicate via the network 106. In some embodiments, the CPM system 200 includes a CPM server 208 and a central data repository 210. The PM systems 202a-202z may include combinations of PM servers 204a-204z and data repositories 206a-206n.

The PM systems 202a-202z may be similar to the PM system 102 in that the PM systems 202a-202z may monitor components of application systems 100. As such, the discussion here for the PM system 102 is applicable to the PM systems 202a-202z. The PM systems 202a-202z may contain PM servers 204a-204z similar to the PM server 120, and data repositories 206a-206n similar to the data repository 122. The PM systems 202a-202z may have servers 204a-204m that each have a separate data repository 206a-206m (e.g., PM system 202a) or the PM systems 202a-202z may have servers 204n-204z that share a single data repository 206n (e.g., as seen in the PM system 202z). Furthermore, the PM systems 202a-202z may report data to the CPM system 200. The reported data may be related to the intensity level or state information collected by the PM systems 202a-202z, or data related to the parameters of the DIF.

The CPM system 200 is a monitoring system that may use the reported data from the PM systems 202a-202z to monitor and tune the PM systems 202a-202z, or the components and application systems 100 monitored by the PM systems 202a-202z. As such, the CPM system 200 monitors application systems 100 through PM systems 202a-202z. In some embodiments, the CPM system 200 has the ability to compare similar components, similar application systems 100, and similar components within different application systems 100. In some embodiments, the agents 118 and PM systems 202a-202z communicate indirectly with each other across the known infrastructure, through the CPM system 200.

The CPM server 208 is a computing device including one or more processors that monitors the reported data sent from the PM systems 202a-202z. The CPM server 208 may compare the reported data with one or more threshold values. Alternatively, the CPM server 208 may create threshold values based upon the reported data. The CPM server 208 may also generate a notification and/or instructions to be sent to the client device 104 (described with reference to FIG. 4), the PM systems 202a-202z, and/or individual agents 118.

In some embodiments, the CPM server 208 of the CPM system 200 classifies components monitored by the PM systems 202a-202z into one or more component groups. Components may be grouped based on common characteristics. As shown in FIG. 2, the component group 220 includes multiple applications monitored by the PM systems 202a-202z, such as application 208a monitored by the PM system 202a and application 208z monitored by the PM system 202z. In another example, a component group may be several databases (e.g., MySQL databases) running in a cloud computing system (e.g., Amazon EC2). In another example, a component group may include several applications 108 operating in a web service stack (e.g., LAMP).

A component group may include components from a common and/or different application systems 100, and a component may be a member of several component groups. For example, a component group may include a plurality of containers 116 from a plurality of application systems 100 or a single application system 100, or a plurality of virtual machines 112, or a plurality of similar applications 108. A component group may also include different components. For example, a component group may include similar but different components that share common characteristics of interest for performance monitoring.

In some embodiments, the CPM server 208 provides guidance to the PM servers 204a-204z about component groups to be aware of and behaviors of those groups. Using the state information collected from a component group, the CPM server 208 can determine patterns associated with the component group. These determined patterns allow the CPM server 208 to make judgements and/or actions concerning typical behaviors associated with the component group. In some embodiments, the CPM server 208 communicates these judgements, and/or actions to the PM servers 204a-204z. For example, several application systems 100, monitored by several PM systems 202a-202z, may have similar system architectures (e.g., similar components). The CPM server 208 may distinguish the application systems 100 into a component group and monitor the behavior occurring across the component group. This may allow the CPM server 208 to make judgements concerning typical behaviors of the similar system architectures in the component group. As a result, the CPM server 208 may provide instructions and/or guidance to the PM servers 204a-204z in the component group concerning the typical behaviors of the similar system architectures.

In some embodiments, the CPM server 208 provides instructions to one or more PM systems 202a-202z defining one or more threshold values for generating a notification and/or instructions to be sent to a client device 104 via the network 106. For example, based upon instructions from the CPM server 208, a PM system 202a may determine that an application system 100 is underperforming (compared to other application systems 100 with similar system architectures). To help correct the underperforming application system 100, the PM system 202a may tune the intensity level for collection of the state information from the application system 100. Furthermore, the PM system 202a may send a notification to a client device 104, or a computing device of the PM system 202a indicating the underperformance, to alert an operator for corrective action.

The CPM server 208 may also make decisions for a component of a component group based upon the state information and/or intensity level from another component in the component group. For example, the CPM system 200 may adjust the intensity of state information collected from an application server 110 in a component group based upon the state information collected from another application server 110 in the component group.

In some embodiments, the CPM server 208 integrates with cloud computing systems to make judgements about the behaviors of the cloud computing systems and hosted components. The cloud computing system may use containers 116 to provide a serverless architecture for monitored components. In this example, the application system 100 is a cloud computing system. A component may be hosted by the cloud computing system, and monitored by an agent 118 of the cloud computing system. From the state information received from the agents 118 running in those environments, the CPM server 208 can make judgements about the behaviors of the cloud computing system. The CPM server 208 may also provide guidance to the PM servers 204a-204z, monitoring components hosted by the cloud computing system, about potential problems encountered in the cloud computing system environment, even when individual PM servers 204a-204z within those environments have not yet detected the problem. For example, if several agents 118 indicate that a particular cloud data center is having a problem, the CPM server 208 may notify the PM servers 204a-204z monitoring components sharing the data center that an issue may be occurring. The PM servers 204a-204z may then notify the system operators and adjust their agents 118 accordingly.

Among the advantages, by examining the performance of different component groups, the CPM server 208 may quantify which architecture styles are more performant than others. It may also quantify which cloud computing systems or tools are more performant than others. In some embodiments, the CPM server 208 provides on-going performance summaries of component performance in cloud computing systems, and comparisons of component performance against other cloud computing systems.

The central data repository 210 stores data used by the CPM system 200, including the reported data collected from the PM systems 202a-202z, and data generated by the CPM server 208.

In some embodiments, the PM system 102 performs some or all of the discussion herein with respect to the functionality of the CPM server 208. For example, PM servers 204a-204z may operate in a peer-to-peer relationship or otherwise communicate their state information, DIF values, intensity levels, etc., and may alter the monitoring behavior of their agents 118 based on these communications between PM servers 204a-204z.

Figure 3:
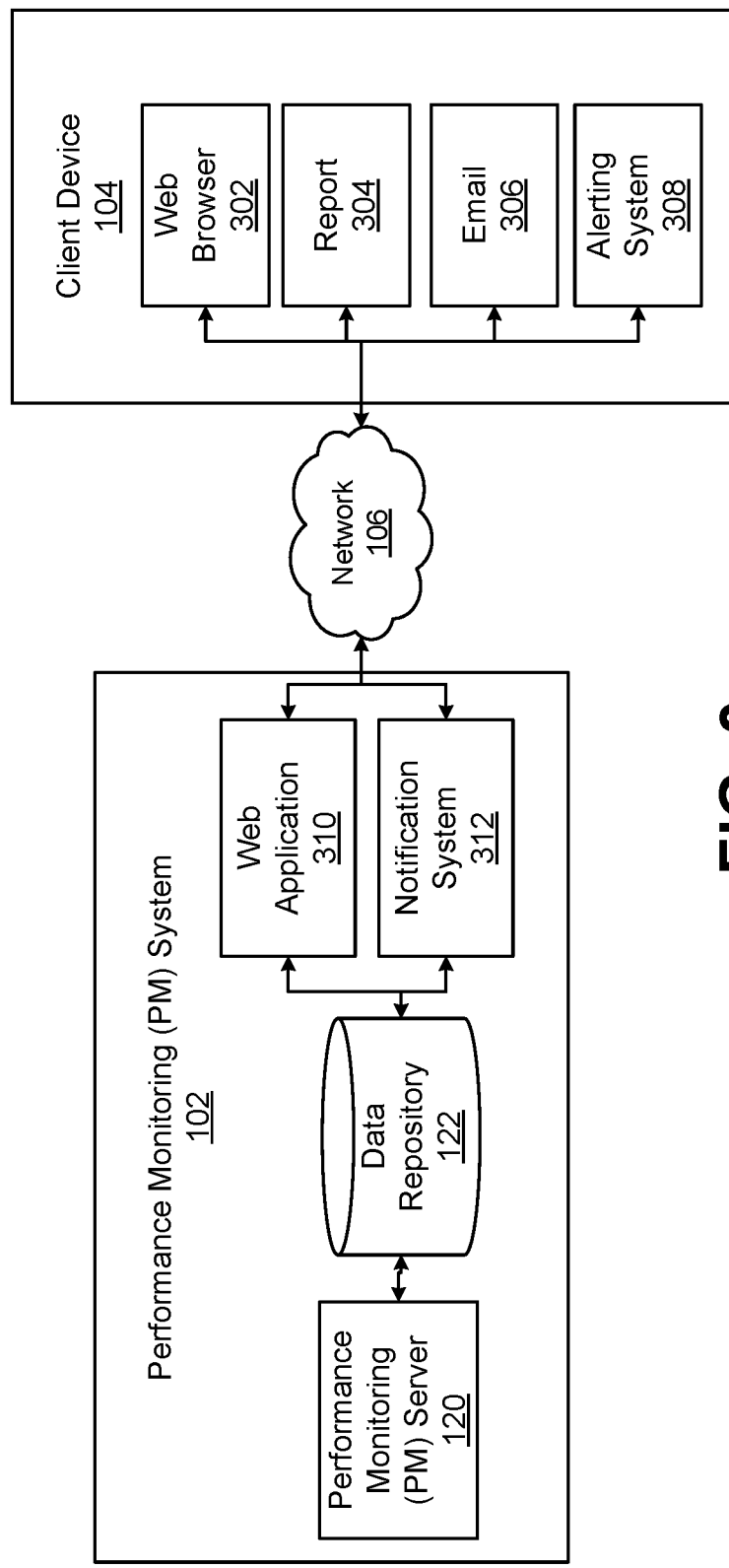
FIG. 3 is a schematic block diagram illustrating a system environment for a PM system to communicate with a client device, according to one embodiment.

FIG. 3 is a schematic block diagram illustrating a system environment for a PM system 102 to communicate with a client device 104, according to one embodiment. The environment includes a PM system 102 and a client device 104. The PM system 102 may include a web application 310 and/or notification system 312. The client device 104 may include a web browser 302, report 304, email 306, and/or alerting system 308. The PM system 102 and client device 104 are not limited to the modules seen in FIG. 3 but may include more or less modules for communicating to each other.

The web application 310 and notification system 312 communicate content between the PM system 102 and the client device 104 regarding the performance of a monitored application system 100. In some embodiments, the web application 310 and notification system 312 are executed by the PM server 120 to retrieve and store content in the data repository 122. Additionally, the web application 310 may generate user interfaces for rendering at the web browser 302, generate reports for rendering at the report 304, and perform functions requested by the web browser 302 and/or report 304. The notification system 312 may generate notifications that contain instructions or information and send them to the email 306 and/or alerting system 308 of a client device 104.

The web browser 302, report 304, email 306, and alerting system 308 communicate content between the PM system 102 and the client device 104 regarding the performance of the application system 100. The web browser 302 is a software application for rendering user interfaces and retrieving, presenting, and traversing content between the web browser 302 and web application 310 relating to the performance of the monitored components. The report 304 renders transmitted information from the web application 310 indicating performance information, such as the calculated DIF, state information, and/or intensity level. The email 306 is a module for exchanging messages containing performance information between the notification system 312 and client device 104. The alerting system 308 is a system for alerting a user of the client device of information or instructions relating to the performance of the application system 100.

Figure 4:
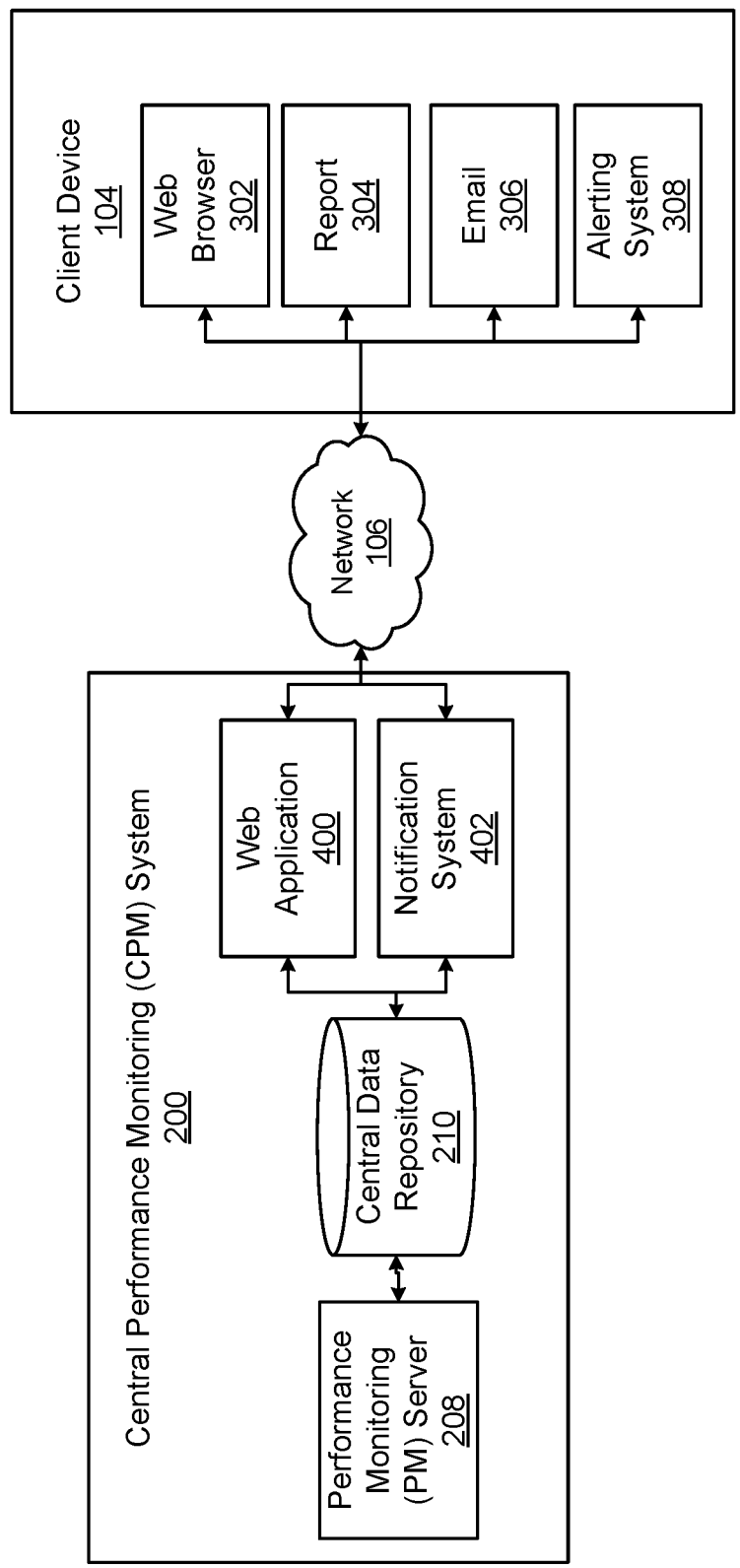
FIG. 4 is a schematic block diagram illustrating a system environment for a CPM system to communicate with a client device, according to one embodiment.

FIG. 4 is a schematic block diagram illustrating a system environment for a CPM system 200 to communicate with a client device 104, according to one embodiment. By monitoring behavior of the PM systems 202a-202z, the CPM system 200 may provide instructions and/or guidance to system operators using a client device 104. The environment includes a CPM system 200 and client device 104. The CPM system 200 may include a web application 400 and/or notification system 402. The web application 400 and notification system 402 may be similar to the web application 310 and notification system 312 in the PM system 102, but may also communicate information relating to the CPM system 200, such as reports containing aggregated information from or relating to the PM systems 202a-202z. The CPM system 200 and client device 104 are not limited to the modules seen in FIG. 4 but may include more or less modules for communicating to each other.

FIG. 5 is a flowchart illustrating a method 500 for changing the data collection intensity by an agent 118 of a component of an application system 100, according to one embodiment. Among other advantages, the method 500 allows the intensity level of state information to be adjusted based upon the previously received state information. In some embodiments, the steps of the method 500 are performed by the PM server 120 of the PM system 102. The steps may be performed in different orders, and the method 500 may include different, additional, or fewer steps.

The PM server 120 receives 502 first state information from an agent 118 of a component of an application system 100. The first state information includes performance information regarding the component, and the first state information is collected at a first intensity level by the agent 118.

Based upon the first state information, the PM server 120 determines 504 a second intensity level for collecting second state information regarding the component by the agent 118, the second intensity level being different from the first intensity level. In some embodiments, the PM server 120 determines an updated intensity level based on the received state information, or changes between the received state information and previous instances of state information (e.g., historical state information regarding the component). For example, the second intensity level for collecting second state information may be determined based on the DIF. The PM server 120 determines the E, T, N, P, SR, and SH parameters from the received state information to calculate a DIF. From the DIF, the PM server 120 determines the second intensity level. For example, a higher DIF indicates more activity of interest, and thus can be correlated with a higher intensity level for further collection of state information.

In some embodiments, the PM server 120 compares the received state information at the first intensity level with one or more threshold values. In response, the PM server 120 may generate a notification and/or instructions to be sent to the client device 104 and/or the agent 118. This may be in response to comparing the first state information with historical state information regarding the component.

In some embodiments, the PM server 120 determines a second intensity level due to instructions from a client device 104 or CPM server 208. In some embodiments, errors or malfunctions in the operations of the application system 100 and/or monitored components result in the PM server 120 determining a second intensity level.

The PM server 120 sends 506 an instruction to the agent 118 that causes the agent 118 to collect the second state information at the second intensity level. The second intensity level may be higher or lower than the first intensity level. Furthermore, the second state information may include different performance data than the first state information. For example, the second intensity level can be associated with instrumentation and collection of state information for additional processes, packages, or other parts of the monitored component. In another example, a higher intensity level can be associated with deeper discovery process invocation chains and collection of their state information. In some embodiments, the intensity level effects the type of state information collected, and thus the types of E, T, N, P, SR, and SH values will change. For example, the second state information may include more information relating to user events E than the first state information (this would also affect the DIF calculated from the second state information). In some embodiments, the instructions may cause the agent 118 to collect the second state information at specific time and/or for a duration of time.

The PM server 120 receives 508 the second state information collected by the agent 118 at the second intensity level from the agent 118. In some embodiments, the method 500 is repeated. For example, using the second state information, the PM server 120 determines a third intensity level, instructs the agent 118 to collect third state information at the third intensity level, and, as a result, receives third state information collected by the agent 118 at the third intensity level. Repeating method 500 may be done any number of times. In some embodiments, by repeating method 500, the PM server 120 increases instrumentation and collection of state information as needed to diagnose performance issues that are initially difficult to understand or detect. In some embodiments, by repeating method 500, the PM server 102 decreases instrumentation and collection of state information to minimize resource usage by the monitoring system.

In one example of method 500, if state information indicates that the process state value P of a data store 114 increased, in response the PM server 120 may increase the intensity level. Similarly, the other DIF factors may be monitored on an individually basis and compared with thresholds to trigger higher or lower intensity levels.

In another example of method 500, a source of a high error rate on a data store 114 is initially undetected by the application system 100. However, agents 118 report that throughput from the microservices of the application system 100 is reduced. In response, the PM server 120 performs an analysis and increases the intensity level. State information collection at the increased intensity level reveals that queries are failing to execute because table scans are occurring against critical tables in the relational data store 114.

In another example of the method 500, after an automatic update on an application server 110, users see an increase in application errors. Operators of the application system 100 are unable to detect the root cause. The PM system 102 determines that there are application 108 issues occurring, based upon state information from the agents 118. In response, the PM server 120 performs an analysis and increases the intensity level by the agent 118 for the application 108 to collect state information relating to system updates and current application errors.

In another example of the method 500, an application 108 has crashed. Upon inspection by an operator, the application server 110 appears fine, no application errors are thrown, and internal operations can execute requests from a client device 104. Upon detecting an issue, the PM server 120 increases the intensity level of state information relating to network communications between the application server 110 and the external network 106. Afterwards, the PM server 120 determines, based on network parameters in the state information collected at the increased intensity level, that the Domain Name System (DNS) record has been deleted.

FIG. 6 is a flowchart illustrating a method 600 for changing the data collection intensity by a plurality of agents 118 of components of a system, according to one embodiment. Among other advantages, the method 600 allows the intensity level of state information collected by a plurality of agents 118 to be adjusted based upon the previously received state information. For example, instead of uniformly collecting state information at a same intensity level for several application servers 110, the PM server 120 can collect state information at a high intensity level from a few of the application servers 110 and collect state information at a low intensity level from the rest of the application servers 110. In some embodiments, the steps of the method 600 shown in FIG. 6 are performed by the PM server 120 of the PM system 102. The steps may be performed in different orders, and the method 600 may include different, additional, or fewer steps.

The PM server 120 receives 602 from one or more agents 118 of one or more components of an application system 100, first state information regarding the components, the first state information collected by the agents 118 at a first intensity level. In some embodiments, the PM server 120 receives 602 state information from multiple agents 118 of multiple components, and at a many different of intensity levels, and aggregates the state information into the first state information.

Based upon the first state information, the PM server 120 determines 604 a second intensity level for collecting second state information regarding the components by the agents 118 based on the first state information, the second intensity level being different from the first intensity level. In some embodiments, the second intensity level is a different intensity level for each agent 118. The discussion at step 504 of the method 500 regarding determination of intensity level from state information may be applicable at step 604.

The PM server 120 sends 606 instructions to the one or more agents 118 of the one or more components, the instructions causing each of the agents 118 to selectively collect state information at the first intensity level or the second intensity level. In some embodiments, the PM server 120 only sends instructions to the agents 118 that the PM server 120 determines to collect state information at the second intensity level. In some embodiments, the PM server only sends instructions to the agents 118 that the PM server 120 determines to continue to collect state information at the first intensity level.

In some embodiments, the PM server 120 rotates intensity levels for different agents 118. In some embodiments, the PM server 120 determines that it is not necessary for all agents 118 to collect state information at the same intensity level. As a result, the PM server 120 rotates which agents 118 collect state information at higher intensity levels (e.g., the second intensity level). Over time, the rotation allows all agents 118 to periodically collect state information at higher intensity levels. This may be advantageous over other embodiments which instruct all agents 118 to collect state information at higher intensity levels at the same time, for example, because high levels of overall state information collection can impact system performance and generate large volumes of state information.

Among other advantages, this may increase efficiency by eliminating unnecessary collection of state information and/or reduce unnecessary resource consumption of the components by the agents 118 to collect state information. For example, if an application server 110 is executing five applications 108 that are all executing a same subset of operations, then uniform collection of state information by the agents 118 at the same intensity level may be redundant. If the PM server 120 only needs state information from one of the applications 108, by lowering the intensity level of the agents 118 monitoring four of the applications 108, the PM server 120 may eliminate unnecessary redundant state information.

The PM server 120 receives 608 the state information from the plurality of agents 118 at the first intensity level or the second intensity level. In some embodiments, the PM server 120 receives 608 state information at many different intensity levels from the agents 118. In some embodiments, the method 600 is repeated. For example, using the state information received from the agents 118 at the first and/or second intensity level, the PM server 120 determines a third intensity level, instructs each of the agents 118 to collect state information at the first, second or third intensity level, and, as a result, receives state information from each of the agents 118 at the first, second or third intensity level, and so forth. Here, the first intensity level may be a default intensity level while the second and third intensity levels may be higher intensity levels that are set for agents 118 of higher interest or may be lower intensity levels that are set for agents 118 whose components have a lower need for monitoring. In some embodiments, the discussion above with reference to the method 500 in FIG. 5 may also apply to the method 600 described in FIG. 6.

In some embodiments, the CPM system 200 performs the method 600. For example, agents of different PM systems 202 can monitor components of different application systems 100. The CPM server 208 collects state information from multiple PM systems 202 to determine intensity levels for components, and then send instructions to different agents either directly or through a PM server 204 to change intensity levels of the components.

Figure 7:
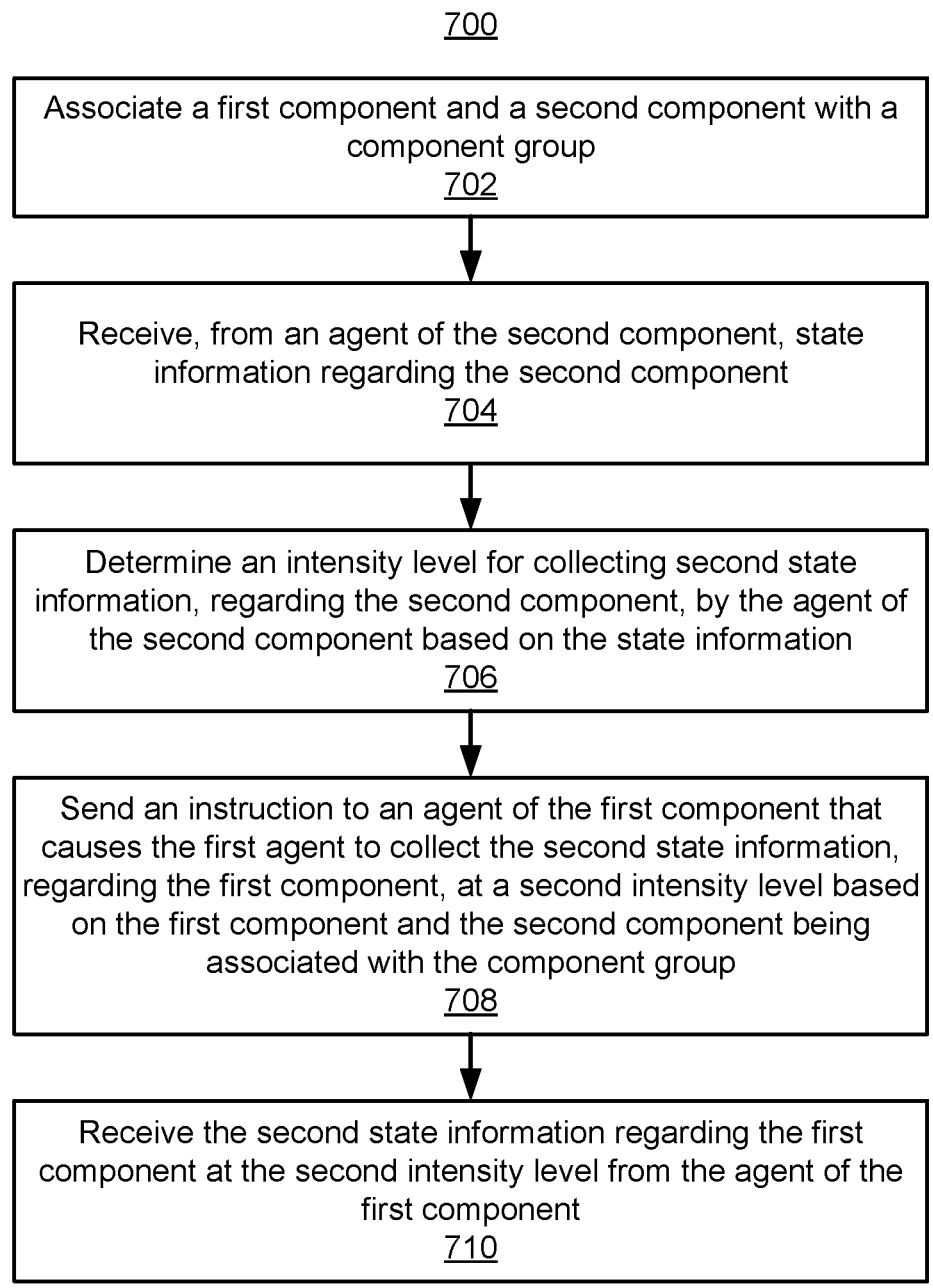
FIG. 7 is a flowchart illustrating a process for changing the data collection intensity by an agent based upon the data collected by another agent in a component group, according to one embodiment.

FIG. 7 is a flowchart illustrating a method 700 for controlling the data collection intensity by an agent 118 based on component group, according to one embodiment. Among other advantages, the method 700 allows for variation in data collection intensity based on components sharing common properties. For example, a PM server 120 may associate several servers 110 of an application system 100 into a component group, and adjust the intensity level of one of the servers 110 based upon state information received from the other servers 110. In another example, a PM server 120 monitoring a component group may increase the intensity level for a component in the component group based on issues detected in other components in the component group. In some embodiments, the steps of the method 700 shown in FIG. 7 are performed by the PM server 120 of the PM system 102. In some embodiments, the steps of the method 700 are performed by the CPM server 208 of the CPM system 200. The steps may be performed in different orders, and the method 700 may include different, additional, or fewer steps.

The PM Server 120 associates 702 a first component monitored by a first agent 118 and a second component monitored by a second agent 118 into a component group. In some embodiments, component groups include components that are related or share similar properties of interest for performance monitoring. As such, changes in the state information collected and/or intensity level of one component in a component group is relevant to other components in the component group. The first component and second component may be the same (e.g., different instances), similar, or different components. The first component and second component may be components in the same application system 100 or different application systems 100. In some embodiments, one agent 118 may monitor both components. In some embodiments, the component group includes any number of components.

The PM server 120 receives 704 from the second agent 118 of the second component, state information regarding the second component. In some embodiments, the PM server 120 also receives state information from the first agent 118 of the first component.

Based on the state information from the second agent 118 of the second component, the PM server 120 determines 706 an intensity level for collecting second state information. The intensity level for collecting second state information may be determined based on a suitable intensity level for the second agent 118 to collect further state information. The discussion at step 504 of the method 500 regarding determination of intensity level from state information may be applicable at step 706.

The PM server 120 sends 708 an instruction to the first agent 118 of the first component that causes the first agent 118 to collect the second state information, regarding the first component, at a second intensity level based on the first component and the second component being associated with the component group. In some embodiments, the PM server 120 also sends an instruction to the second agent 118 of the second component to collect second state information at the second intensity level.

The PM server 120 receives 710 the second state information at the second intensity level from the first agent 118 regarding the first component. As such, the new intensity level regarding the first component was determined based upon the state information regarding another component in the component group.

The method 700 may be repeated any number of times. For example, using the second state information at the second intensity level regarding the first component in the component group, the PM server 120 determines a third intensity level, instructs the agent 118 of the second component to collect third state information at the third intensity level, and, as a result, receives third state information at the third intensity level from the second agent 118 regarding the second component.

In some embodiments, the CPM system 200 performs the method 700. For example, a component group may include components of different application systems 100 that are monitored by different PM systems 202. The CPM server 208 can group such components monitored by the different PM systems 202, determine intensity levels for one or more of the grouped components, and then send instructions to different agents either directly or through a PM server 204 to change intensity levels of the grouped components.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for monitoring a component of a system, comprising:

receiving, from an agent of the component of the system, first state information regarding the component, the first state information collected by the agent at a first intensity level;

determining a second intensity level for collecting second state information regarding the component by the agent based on the first state information, the first state information including a user event value indicating a number of user events processed by the component and a throughput value indicating a number of requests flowing in and out of the component, the second intensity level being different from the first intensity level;

sending an instruction to the agent that causes the agent to collect the second state information at the second intensity level; and receiving the second state information collected by the agent at the second intensity level from the agent.

2. The method of claim 1, further comprising:

sending instructions to a plurality of agents of a plurality of components, the instructions causing each of the plurality of agents to selectively collect state information at the first intensity level or the second intensity level; and receiving the state information from the plurality of agents at the first intensity level or the second intensity level.

3. The method of claim 2, wherein:

the second intensity level is higher than the first intensity level; and the instructions cause a subset of the plurality of agents to collect the state information at the second intensity level while other agents of the plurality of agents collect the state information at the first intensity level according to rotation.

4. The method of claim 1, wherein determining the second intensity level for collecting the second state information regarding the component by the agent is based on comparing the first state information with historical state information regarding the component.

5. The method of claim 1, further comprising:

associating the component and a second component with a component group;

receiving, from a second agent of the second component, third state information regarding the second component;

determining a third intensity level for collecting fourth state information, regarding the second component, by the second agent based on the third state information;

sending a second instruction to the agent that causes the agent to collect fourth state information, regarding the component, at the third intensity level based on the component and the second component being associated with the component group; and receiving the fourth state information regarding the component at the third intensity level from the agent.

6. The method of claim 1, wherein the first state information further includes at least one of:

a network state value indicating at least one of a latency, a byte transfer rate, a number of packets lost, or a number of packets received;

a process state value indicating at least one of an amount of resource consumption or user heuristics;

a system resource value indicating at least one of available processing resources or available memory resources; or a system health value.

7. The method of claim 6, wherein determining the second intensity level includes determining a data intensity factor defining the second intensity level based on $$\frac{E + T + N + P + SR + SH}{Env},$$

where E is the user event value, T is the throughput value, N is the network state value, P is the process state value, SR is the system resource value, and SH is the system health value, and Env is a weight value for the component.

8. The method of claim 1, further comprising:

comparing the first state information with one or more threshold values; and generating a notification in response to the first state information satisfying the one or more threshold values.

9. The method of claim 1, wherein the component is one of:

a server;
an application;
a container;
a data store; or
a virtual machine.

10. A system for monitoring a component, comprising:

one or more processors configured to:

receive, from an agent of the component, first state information regarding the component, the first state information collected by the agent at a first intensity level;

determine a second intensity level for collecting second state information regarding the component by the agent based on the first state information, the first state information including a user event value indicating a number of user events processed by the component and a throughput value indicating a number of requests flowing in and out of the component, the second intensity level being different from the first intensity level;

send an instruction to the agent that causes the agent to collect the second state information at the second intensity level; and receive the second state information collected by the agent at the second intensity level from the agent.

11. The system of claim 10, wherein the one or more processors are further configured to:

send instructions to a plurality of agents of a plurality of components, the instructions causing each of the plurality of agents to selectively collect state information at the first intensity level or the second intensity level; and receive the state information from the plurality of agents at the first intensity level or the second intensity level.

12. The system of claim 11, wherein:

the second intensity level is higher than the first intensity level; and the instructions cause a subset of the plurality of agents to collect the state information at the second intensity level while other agents of the plurality of agents collect the state information at the first intensity level according to rotation.

13. The system of claim 10, wherein determining the second intensity level for collecting the second state information regarding the component by the agent is based on comparing the first state information with historical state information regarding the component.

14. The system of claim 10, wherein the one or more processors are further configured to:
   associate the component and a second component with a component group;
   receive, from a second agent of the second component, third state information regarding the second component;
   determine a third intensity level for collecting fourth state information, regarding the second component, by the second agent based on the third state information;
   send a second instruction to the agent that causes the agent to collect fourth state information, regarding the component, at the third intensity level based on the component and the second component being associated with the component group; and
   receive the fourth state information regarding the component at the third intensity level from the agent.

15. The system of claim 10, wherein the first state information further includes at least one of:
   a network state value indicating at least one of a latency, a byte transfer rate, a number of packets lost, or a number of packets received;
   a process state value indicating at least one of an amount of resource consumption or user heuristics;
   a system resource value indicating at least one of available processing resources or available memory resources; or
   a system health value.

16. The system of claim 15, wherein determining the second intensity level includes determining a data intensity factor defining the second intensity level based on $$\frac{E + T + N + P + SR + SH}{Env},$$

where E is the user event, T is the throughput value, N is the network state value, P is the process state value, SR is the system resource value, and SH is the system health value, and Env is a weight value for the component.

17. The system of claim 10, wherein the one or more processors are further configured to:
   compare the first state information with one or more threshold values; and
   generate a notification in response to the first state information satisfying the one or more threshold values.

18. The system of claim 10, wherein the component is one of:
   a server;
   an application;
   a container;
   a data store; or
   a virtual machine.

19. A non-transitory computer readable medium storing instructions that when executed by a processor configure the processor to:
   receive, from an agent of a component of a system, first state information regarding the component, the first state information collected by the agent at a first intensity level;
   determine a second intensity level for collecting second state information regarding the component by the agent based on the first state information, the first state information including a user event value indicating a number of user events processed by the component and a throughput value indicating a number of requests flowing in and out of the component, the second intensity level being different from the first intensity level;
   send an instruction to the agent that causes the agent to collect the second state information at the second intensity level; and
   receive the second state information collected by the agent at the second intensity level from the agent.

20. The computer readable medium of claim 19, wherein the instructions further configure the processor to:
   associate the component and a second component with a component group;
   receive, from a second agent of the second component, third state information regarding the second component;
   determine a third intensity level for collecting fourth state information, regarding the second component, by the second agent based on the third state information;
   send a second instruction to the agent that causes the agent to collect fourth state information, regarding the component, at the third intensity level based on the component and the second component being associated with the component group; and
   receive the fourth state information regarding the component at the third intensity level from the agent.

* * * * *

UNITED STATES PATENT AND TRADEMARK OFFICE
CERTIFICATE OF CORRECTION

PATENT NO. : 10,924,364 B2  
APPLICATION NO. : 16/693181  
DATED : February 16, 2021  
INVENTOR(S) : Floyd et al.

Page 1 of 1

It is certified that error appears in the above-identified patent and that said Letters Patent is hereby corrected as shown below:

On the Title Page

Item (58), in Column 2, under "Field of Classification Search", Line 1, below "CPC ....... G09F 11/30; G06F 11/34; H04L 67/22" insert -- USPC ................ 709/224 --.

Item (56), in Column 2, under "U.S. Patent Documents", Line 1, after "Enck" insert -- et al. --.

Item (56), in Column 2, under "U.S. Patent Documents", Line 3, after "Mahesh" insert -- et al. --.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*